United States Patent
Wang

[19]

[11] Patent Number: 6,152,452

[45] Date of Patent: Nov. 28, 2000

[54] FACE SEAL WITH SPIRAL GROOVES

[76] Inventor: Yuming Wang, Keyandong Road 7#, Nankai District, Tianjin 300192, P. R., China

[21] Appl. No.: 09/172,002

[22] Filed: Oct. 14, 1998

[30] Foreign Application Priority Data

Oct. 17, 1997 [CN] China .................................. 97117081.9

[51] Int. Cl.⁷ ...................................................... F16J 15/38
[52] U.S. Cl. ........................... 277/400; 277/96.1; 277/96; 277/399
[58] Field of Search .................... 277/400, 399, 277/401, 408, 388, 96.1, 96

[56] References Cited

U.S. PATENT DOCUMENTS

| | | | |
|---|---|---|---|
| 5,201,531 | 4/1993 | Lai | 277/96.1 |
| 5,398,943 | 3/1995 | Shimizu et al. | 277/96.1 |
| 5,435,574 | 7/1995 | Victor et al. | 277/96 |
| 5,529,315 | 6/1996 | Borrino et al. | 277/96.1 |
| 5,713,576 | 2/1998 | Wasser et al. | 277/96.1 |
| 5,847,479 | 12/1998 | Wang | 277/400 |

*Primary Examiner*—Anthony Knight
*Assistant Examiner*—Mark Williams
*Attorney, Agent, or Firm*—Dykema Gossett PLLC

[57] ABSTRACT

The present invention provides a face seal with spiral grooves comprising: a rotating ring including a sealing face; a stationary ring including a sealing face; the face is confronted with the face of the rotating ring to form a circular interface having a circle center; the faces of the rings can rotate relatively to each other; two spiral groove sets are provided at least on one of the faces of the rotating and the stationary rings, wherein one set disposed on the high pressure side, i.e. at the upstream, and the other set disposed on the low pressure side, i.e. at the downstream; the spiral angles of these two spiral groove sets are opposite to each other; the radial length of an upstream spiral groove is greater than that of a downstream spiral groove; and an annular flat belt is further provided at the downstream of the downstream spiral groove set.

13 Claims, 10 Drawing Sheets

FACE SEAL WITH SPIRAL GROOVES

INTRODUCTION OF THE INVENTION

The present invention relates to face seals, particularly to a face seal with spiral grooves. The face seal can be used on the rotating shaft of various machines, such as compressor, expander, pump, agitator of reactor, etc.

BACKGROUND

Chinese Patent Application Publication No. CN1045851A, published on Oct. 3, 1990 and entitled "face seal with spiral grooves having "八" pattern", and U.S. Pat. No. 5,201,531, published on Apr. 13, 1993 and entitled "face seal with double spiral grooves", each discloses a pure hydrodynamic face seal with double spiral grooves. In the face seal, the radial length of a spiral groove located on the high pressure side, i.e. at the upstream, is less than that located on the low pressure side, i.e. at the downstream. In a given rotational direction, the upstream spiral groove set pumps sealing fluid towards the downstream, while the downstream spiral groove set pumps sealing fluid towards the upstream. The radial length of the downstream spiral groove set has to be great enough, so that the pumping pressure produced by the downstream set can balance the sum of the pumping pressure produced by the upstream set and the pressure difference between the fluid inside and outside the interface. That is to say, the pumping pressure difference produced by these two spiral groove sets must be balanced with the pressure difference between the fluid inside and outside the interface, in order that the leakage of the sealing fluid is ensured to be zero theoretically. However, the kind of seal is only suitable for the condition where the fluid pressure difference across the interface is rather low and viscosity of the sealing fluid is rather high.

All conventional combined hydrodynamic and hydrostatic face seals with spiral grooves are those with monoline spiral grooves. There is an annular flat belt at the downstream of the spiral grooves, which provides resistance to flow, i.e. "obstruction" role. A similar face seal is disclosed in U.S. Pat. No. 4,212,475.

The object of the present invention is to provide a combined hydrodynamic and hydrostatic face seal with double spiral grooves, which forms a fluid film with greater thickness than the prior art under the same condition, or with greater stiffness under the same thickness of the fluid film.

SUMMARY OF THE INVENTION

Therefore, the present invention provides a face seal with spiral grooves comprising:

a rotating ring including a sealing face;

a stationary ring including a sealing face; the face is confronted with the face of the rotating ring to form a circular interface having a circle center; the faces of the rings can rotate relatively to each other;

two spiral groove sets are provided at least on one of the faces of the rotating and the stationary rings, wherein one set disposed on the high pressure side, i.e. at the upstream, and the other set disposed on the low pressure side, i.e. at the downstream;

the spiral angles of these two spiral groove sets are opposite to each other; the radial length of an upstream spiral groove is greater than that of a downstream spiral groove;

and an annular flat belt is further provided at the downstream of the downstream spiral groove set.

In the present invention, the high pressure side is defined as "upstream", and the low pressure side is defined as "downstream". The "downstream pumping" means the pumping from the upstream towards the downstream. A "radial length of a spiral groove" means the length of a spiral groove in the range of the interface where a rotating ring and a stationary ring is confronted with each other.

Moreover, a "spiral groove" in the present invention means that the overall trend of the groove is approximately a spiral, but is not limited to an accurate spiral in mathematics.

In comparison with a pure hydrodynamic face seal with double spiral grooves, in the present invention, the radial length of an upstream spiral groove is always greater than that of the downstream one. Therefore, under the given rotational direction, the overall effect of these two spiral groove sets is to pump the sealing fluid from the high pressure side towards the low pressure side, i.e. to realize the downstream pumping according to the present invention. Such kind of pumping can produce a slight leakage. However, at the cost of the slight leakage, great thickness and stiffness of the fluid film between two faces are got in return. Therefore, the seal according to the present invention is more suitable for the sealing fluid with low viscosity such as gas, than the prior pure hydrodynamic face seal with double spiral grooves. Meanwhile, it is also more suitable for the condition with higher fluid pressure difference across the interface.

In comparison with the prior combined hydrodynamic and hydrostatic face seal with downstream pumping monoline spiral grooves, in the face seal with spiral grooves according to the present invention, a spiral groove set located at the downstream is added, and the direction of the spiral angle thereof is opposite to that at the upstream. For a given rotational direction, the downstream spiral groove set pumps the sealing fluid from the downstream towards the upstream and plays an active "pushing obstruction" role. However, the annular flat belt in a prior face seal with monoline spiral grooves only plays a passive "obstruction" role. Therefore the seal effect according to the present invention is better. Hence, in the face seal with downstream pumping double spiral grooves according to the present invention, there is a greater thickness of the fluid film between the sealing faces, or a greater stiffness of the fluid film under the same thickness of the fluid film. Moreover, in the present invention, at the downstream of the downstream spiral groove set, there remains an annular flat belt, which provides resistance to flow during rotation and static sealing under a static condition.

Further objects and advantages of the invention will appear from the following description taken together with the accompanying drawings.

Figure 1:
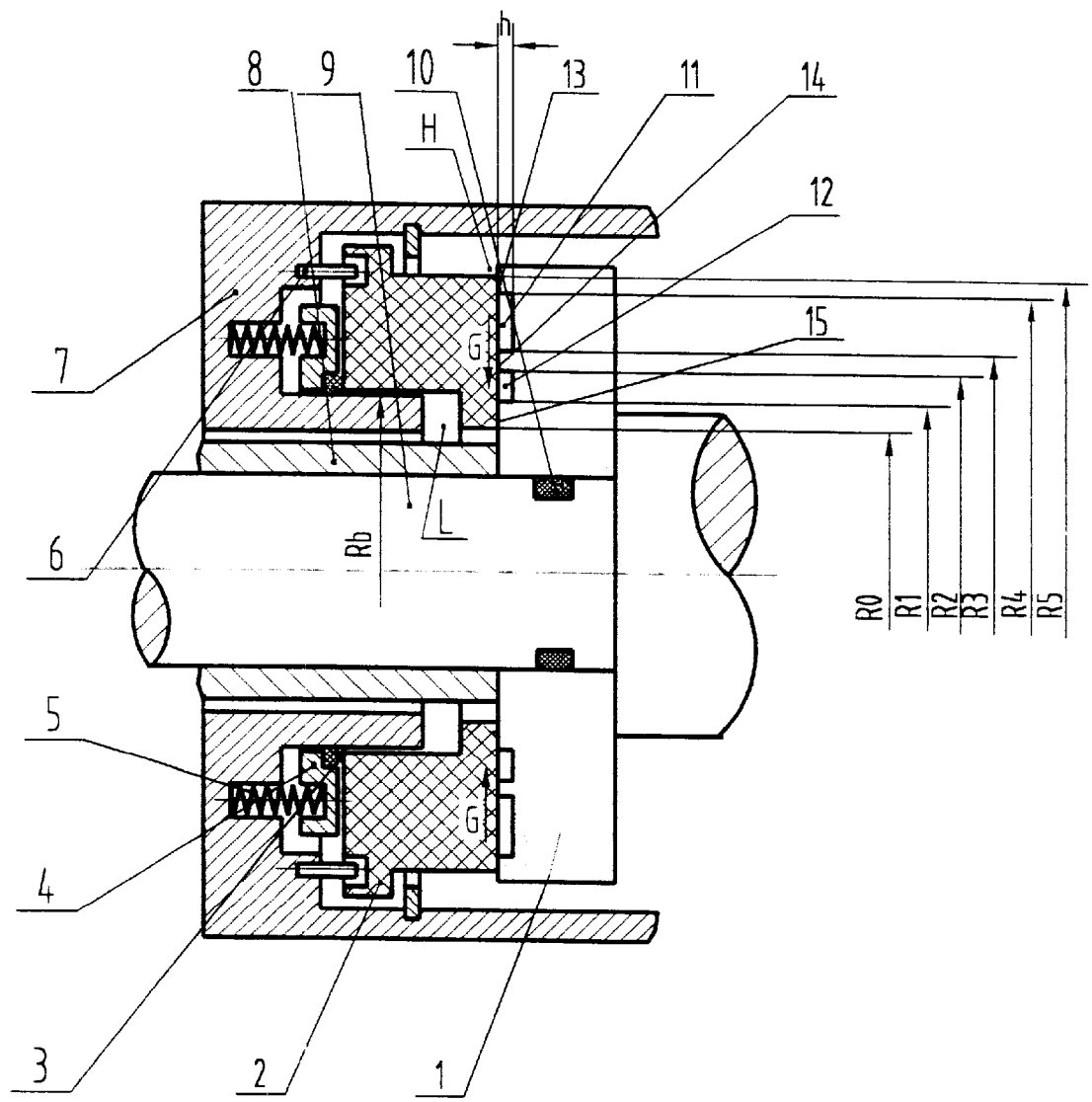
FIG. 1 is a view of a face seal with downstream pumping double spiral grooves, showing the spiral grooves provided on the rotating ring, wherein the outside of the interface is a high pressure side.

In the above drawings, the meanings of the symbols are as follows:

$R_b$—balance radius
α—spiral angle
h—depth of a spiral groove
$S_1$—normal width of an upstream spiral groove
$S_2$—normal width of an upstream land
$S_3$—normal width of a downstream spiral groove
$S_4$—normal width of a downstream land
H—high pressure side, i.e. upstream
L—low pressure side, i.e. downstream
G—the overall pumping direction of two spiral groove sets
$R_0$—inner radius of the interface between the rotating and the stationary rings
$R_1$—inner radius of a downstream spiral groove
$R_2$—outer radius of a downstream spiral groove
$R_3$—inner radius of an upstream spiral groove
$R_4$—outer radius of an upstream spiral groove
$R_5$—outer radius of the interface between the rotating and the stationary rings
$R_{10}$—outer radius of the interface between the rotating and the stationary rings
$R_{11}$—outer radius of a downstream spiral groove
$R_{12}$—inner radius of a downstream spiral groove
$R_{13}$—outer radius of an upstream spiral groove
$R_{14}$—inner radius of an upstream spiral groove
$R_{15}$—inner radius of the interface between the rotating and the stationary rings

DETAILED DESCRIPTION OF THE PREFERRED EMBODIMENTS

It shall be noted that in the drawings of the present invention, particularly in FIGS. 1–3 and FIGS. 9–11, the essential meanings of the shown radii $R_1$–$R_4$ and $R_{11}$–$R_{14}$ of the spiral grooves in the description of the present invention refer to the maximum or the minimum radii of the spiral grooves. The position where the cross section view is cut through is probably not the location of the maximum or the minimum diameter of the spiral groove. However, such illustration is easier for readers to understand the present invention.

Moreover, in the drawings of the present invention, a spiral groove seems to be consisted of three or four groove walls. However, in practice, a spiral groove is consisted of two main groove walls and one or two transitional groove walls. The profiles mentioned in the description of the present invention refer to the profiles of two main groove walls.

FIG. 1 is a view of a face seal with downstream pumping double spiral grooves, showing the spiral grooves provided on the rotating ring. A sealing device comprises a rotating ring 1, a stationary ring 2, a secondary sealing ring 3, a thrust ring 4, springs 5, an antirotating pin 6, a housing 7, a sleeve 8, a shaft 9, and a stationary sealing ring 10.

Figure 5:
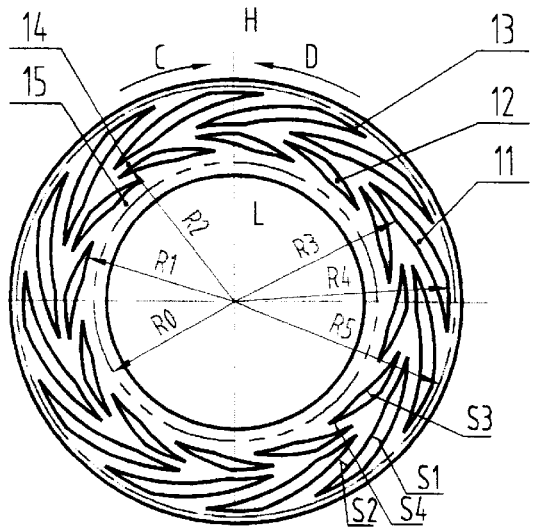
FIG. 5 is a plan view of a sealing face, wherein the outside of the interface is a high pressure side and an annular flat belt is located both between two spiral groove sets, and on the outside of the upstream spiral grooves too.
Figure 7:
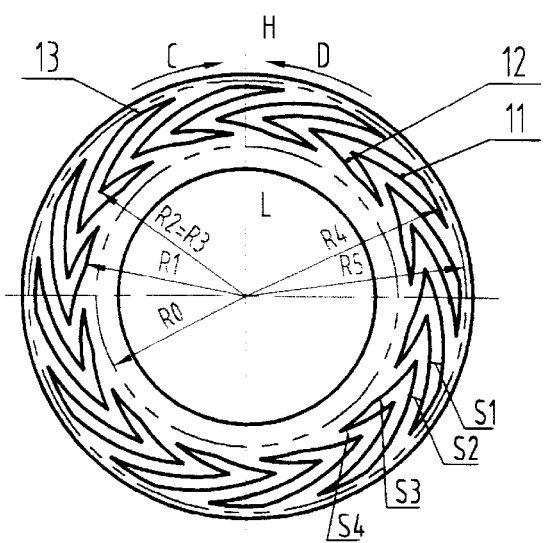
FIG. 7 is a plan view of a sealing face, wherein the outside of the interface is a high pressure side. There is no annular flat belt located between two spiral groove sets. However there is an annular flat belt outside the upstream spiral grooves.

The sealing faces of the rotating ring 1 and the stationary ring 2 are confronted against with each other and can rotate relatively to each other. The confronted surfaces of both rings are the sealing faces. In the embodiment, the outside of the interface is the high pressure side, i.e. upstream H. Two spiral groove sets are provided on the sealing face of the rotating ring 1. On the high pressure side H, there is a spiral groove set 11, and on the low pressure side L, there is a spiral groove set 12. The radial length ($R_4$–$R_3$) of an upstream spiral groove is greater than ($R_2$–$R_1$) of a downstream spiral groove, as shown in FIGS. 5 and 7. The ratio of the radial length of an upstream spiral groove and that of a downstream spiral is greater than 1 and less than or equal to 5.

Figure 4:
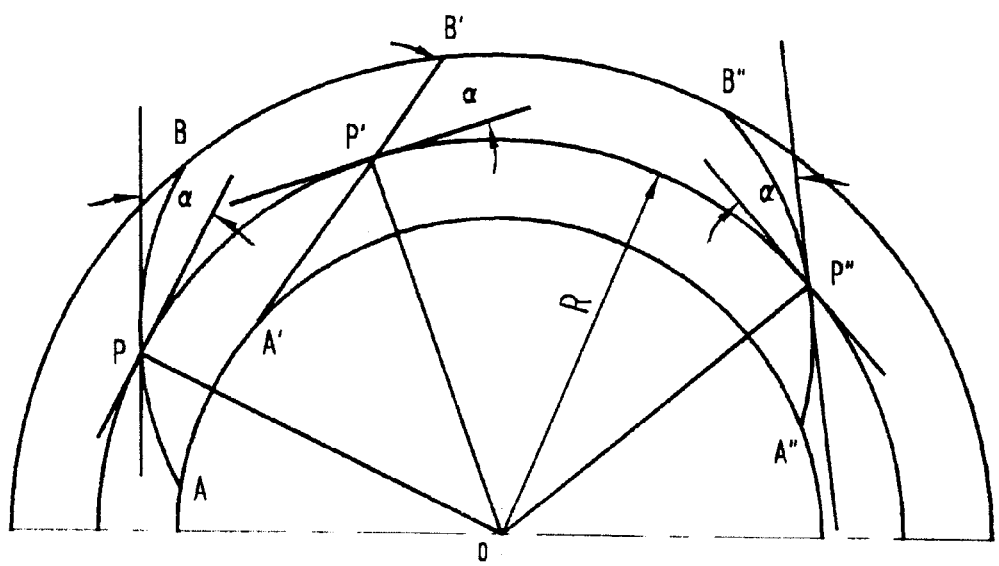
FIG. 4 is a schematic view of the profile of a spiral groove.

For a given rotational direction, the upstream spiral groove set pumps sealing fluid downstream, while the downstream spiral groove set pumps the sealing fluid upstream, since these two spiral groove sets have opposite directions of spiral angles. Therefore, the overall effect of these two spiral groove sets is to pump the sealing fluid from upstream towards downstream along the direction shown as arrow G, so that a slight leakage is produced. On the outside of the upstream spiral grooves, there is an annular flat belt 13, i.e. the annular belt between $R_5$ and $R_4$. There is also an annular flat belt 14 between these two spiral groove sets, i.e. the annular belt between $R_3$ and $R_2$. In addition, on the inside of the downstream spiral grooves there is further an annular flat belt 15, i.e. the annular belt between $R_1$ and $R_0$, which provides resistance to flow and static sealing. The profile of a groove wall of a spiral groove can be any curves as shown in FIG. 4, for example a logarithmic spiral, except for the circles concentric with the outer circle of the sealing faces, or can be any straight line except for the radial straight line passing through the center of the outer circle of a sealing face. The range of the spiral angle can be $0°<|\alpha|<90°$, and the preferable range is within 5°–30°, for example 20°. The length h of the depth of the upstream and downstream spiral grooves can be constant for example 0.02 mm along the radial and the extending directions, or varied within the range of 0.002–0.2 mm, preferably within the range of 0.005–0.1 mm. The width of the spiral groove can be constant, or varied. For example, a spiral groove can be widened gradually from inner to outer radius. The range of the normal width $S_1$, $S_3$ can be 0.2–20.0 mm, and the preferable range can be 0.5–10.0 mm. The width of the land $S_2$, $S_4$ between two adjacent upstream or downstream spiral grooves can also be constant or varied. The respective ratio of the normal width $S_2$, $S_4$ and $S_1$, $S_3$, i.e. $S_2/S_1$ and $S_4/S_3$ can be 0.2–5, and preferably 0.3–3.

Figure 2:
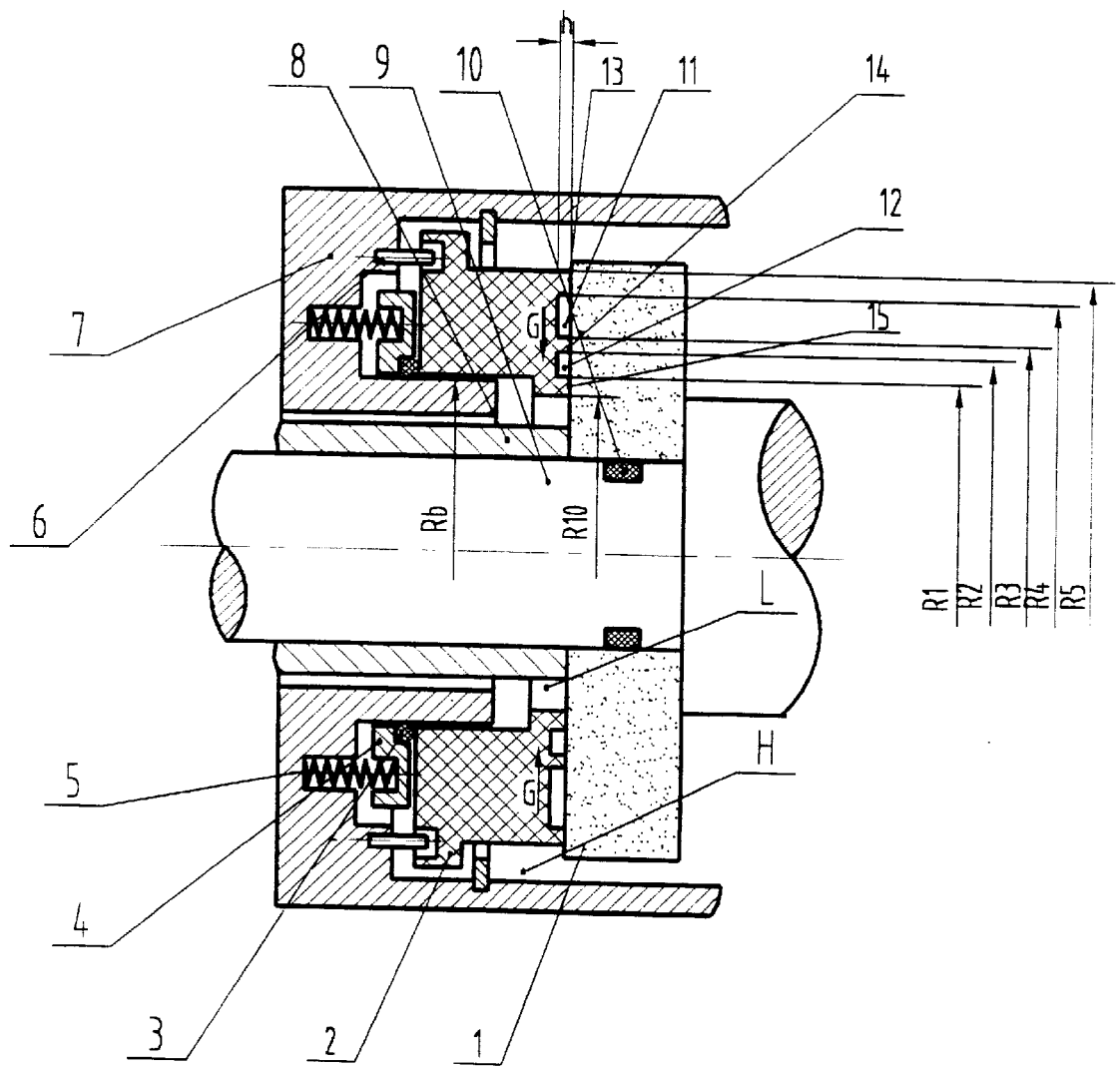
FIG. 2 is a view of a face seal with downstream pumping double spiral grooves, showing the spiral grooves provided on the stationary ring, wherein the outside of the interface is a high pressure side.
Figure 3:
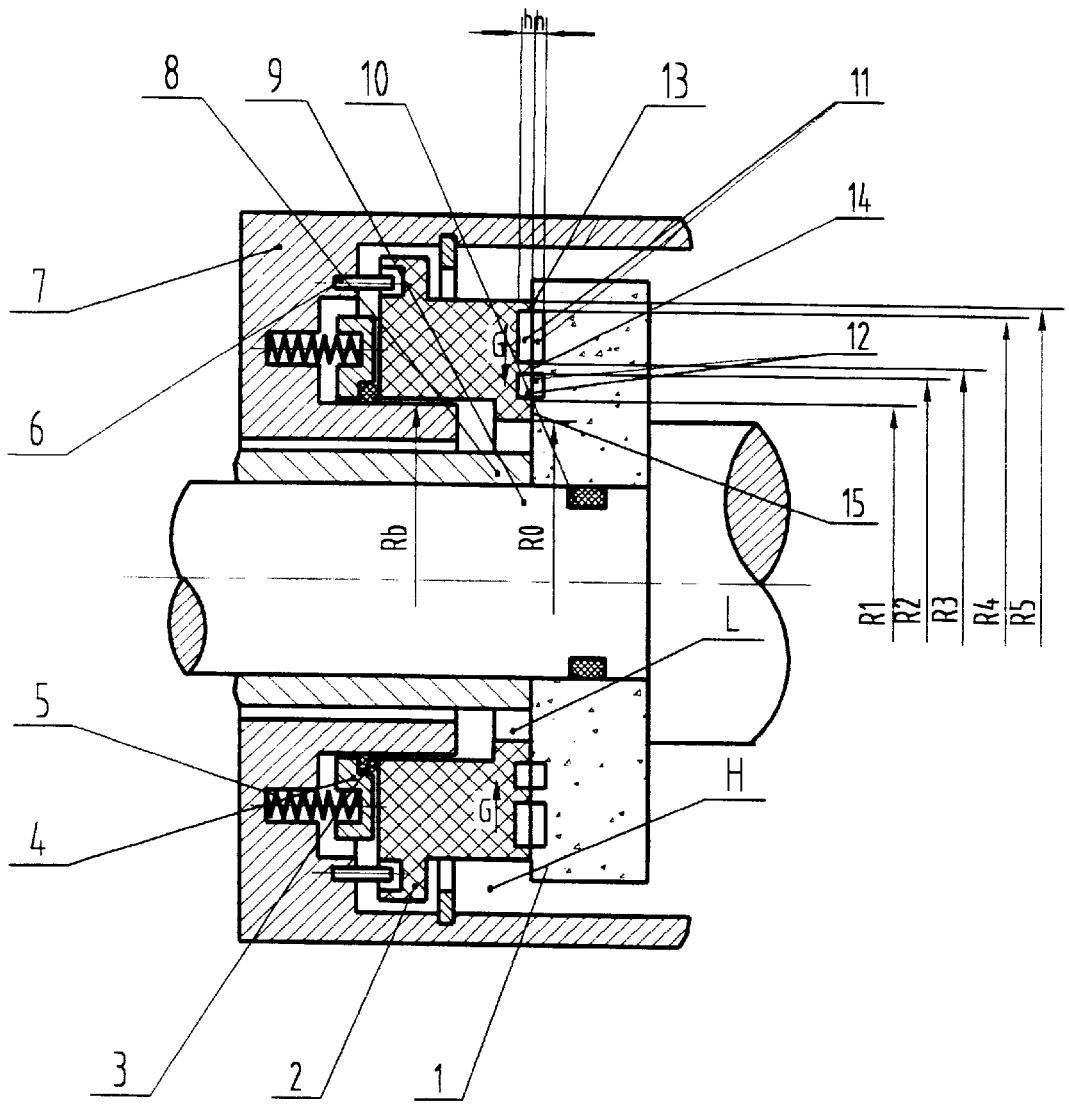
FIG. 3 is a view of a face seal with downstream pumping double spiral grooves, showing the spiral grooves provided at the same time on the rotating and the stationary rings, wherein the outside of the interface is a high pressure side.

The spiral grooves according to the present invention can also be provided on the sealing face of the stationary ring, as shown in FIG. 2. Meanwhile they can be provided on the sealing faces both of the rotating and the stationary rings simultaneously, as shown in FIG. 3.

FIG. 4 is a view of the profile of a groove wall of a spiral groove. The spiral groove has two main groove walls whose profiles can be any curve except for the circle (spiral angle $\alpha=0°$) concentric with the outer circle of a sealing face, or any straight line except for the radial straight line (spiral angle $\alpha=90°$) passing through the circle center of a sealing face. The profile can be for example a logarithmic spiral (having constant spiral), a Archimedes spiral, a circle arc, an angular straight, an angular broken line. A spiral angle is defined as follows: supposed that a smooth curve or a straight line starts from point A (or A', A") at inner radius having less radius, and terminates at point B (or B', B") at outer radius having greater radius, and that a concentric circle located at an arbitrary radius R between the inner and the outer radii intersects the curve or the straight line at point P (or P', P"), the angle between a tangent to the curve at the point P or the straight line itself and the tangent to the concentric circle is defined as the spiral angle. The direction of the spiral angle of the curve AB is opposite to that of the curve A" B". If the former is defined as "+", the latter is then defined as "−". In the present invention, the range of the spiral angle is $0°<|\alpha|<90°$, preferably 5°–30°. Spiral angle can be constant or varied. The curves AB, A' B', and A" B" can be formed by various curves except for concentric circle, or by one or more than straight lines, i.e. a broken line except for the radial straight line.

FIGS. 5–8, 16 and 17 show possible patterns and positions of the spiral grooves on a sealing face, wherein the outside of the interface is the high pressure side, i.e. upstream H.

FIGS. 5 is view showing a sealing face, wherein two annular flat belts are located between the upstream and downstream spiral groove sets and on the outside of the upstream spiral grooves. An annular flat belt 14 is between two spiral groove sets, i.e. between $R_3$ and $R_2$. An upstream and a downstream spiral grooves are not jointed with each other and configured as a pattern of "/\".

On the outside of the upstream spiral grooves 11 is an annular flat belt 13, i.e. between $R_5$ and $R_4$. On the inside of the downstream spiral grooves 12 is further an annular flat belt 15, i.e. between $R_1$ and $R_0$. If the spiral grooves are disposed on the rotating ring, the rotational direction of the ring is the direction of C. If the spiral grooves are disposed on the stationary ring, the rotational direction of the rotating ring is the direction of D.

The two-dot and dash lines shown in FIG. 5 and the following figures indicates the inner and outer edge circle of the interface between the rotating and the stationary rings. In FIG. 5, the radial length of the upstream spiral groove is $(R_4-R_3)$.

Figure 6:
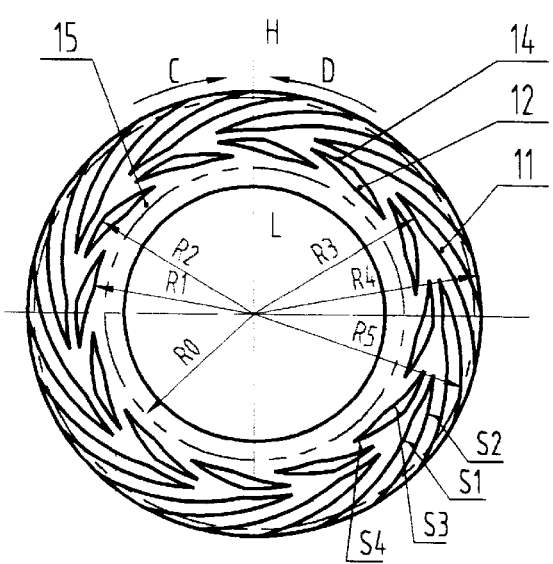
FIG. 6 is a plan view of a sealing face, wherein the outside of the interface is a high pressure side and an annular flat belt is located between two spiral groove sets. However there is no annular flat belt outside the upstream spiral grooves.

FIG. 6 is a view of a sealing face showing that an annular flat belt 14 is located between two spiral groove sets while no annular flat belt is on the outside of the upstream spiral grooves 11. The radial length of the upstream spiral grooves is $(R_5-R_3)$, and at the downstream of the downstream spiral grooves 12 is an annular flat belt 15, i.e. between $R_1$ and $R_0$.

FIG. 7 is view of a sealing face showing that no annular flat belt is between two spiral groove sets while on the outside of the upstream spiral grooves is an annular flat belt 13. Two spiral groove sets are jointed with each other, $R_2=R_3$, and configured as a pattern of "/\". At the downstream of the downstream spiral grooves 12 is an annular flat belt 15, i.e. between $R_1$ and $R_0$.

Figure 8:
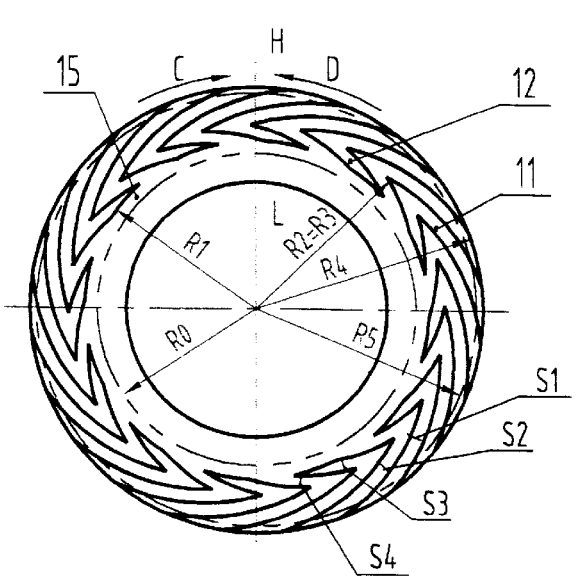
FIG. 8 is a plan view of a sealing face, wherein the outside of the interface is a high pressure side. There is no annular flat belt located between two spiral groove sets and outside the upstream spiral grooves.
Figure 17:
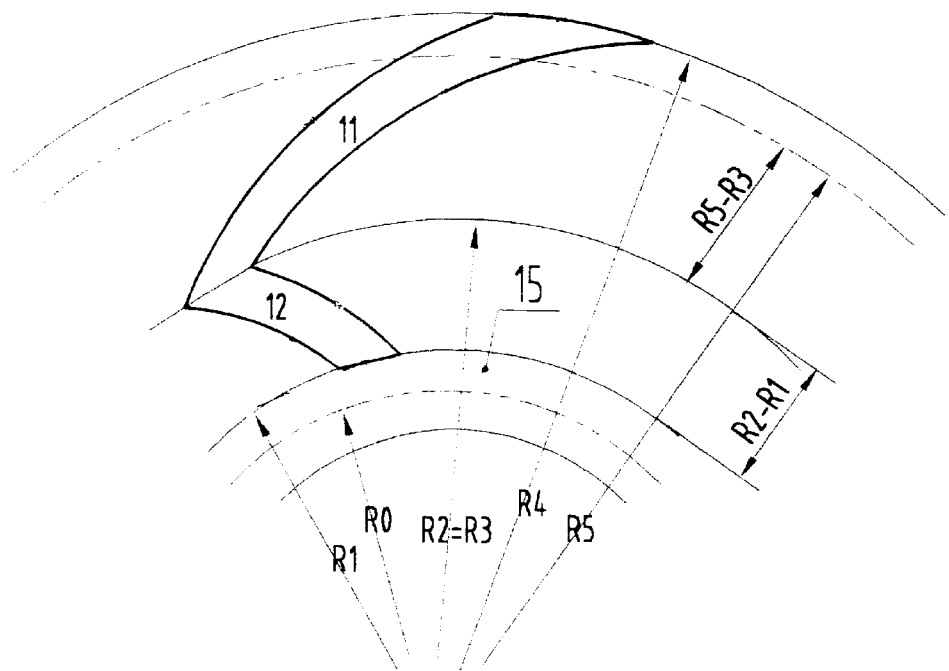
FIG. 17 is a partially enlarged view of FIG. 8.

FIGS. 8, 17 are views of a sealing face, showing that there is no annular flat belt between two spiral groove sets and outside the upstream spiral grooves. As shown in FIGS. 8, 17, the radial length of the upstream spiral grooves 11 is $R_5-R_3$. Two spiral groove sets are jointed with each other, $R_2=R_3$. At the downstream of the downstream spiral grooves 12 is an annular flat belt 15, i.e. between $R_1$ and $R_0$.

The rotational direction of the rotating ring in the figures after FIG. 5 is the same as that of FIG. 5.

In the above embodiments, it is assumed that the outsides of the interface are the high pressure side, i.e. the upstream H, and the insides thereof are the low pressure side, i.e. the downstream L. However, the inside of the interface can also be assumed to be high pressure side, i.e. the upstream H, and the outside thereof can be assumed to be the low pressure side, i.e. the downstream L. The embodiments are shown in FIGS. 9–15.

According to the present invention, the length $(R_{13}-R_{14})$ (FIGS. 12, 14) or $(R_{13}-R_{15})$ (FIGS. 13, 15) of the upstream spiral grooves must be greater than the radial length $(R_{11}-R_{12})$ of the downstream spiral grooves. The ratio of the radial length of an upstream spiral groove and that of a downstream spiral is greater than 1 and less than or equal to 5.

Figure 9:
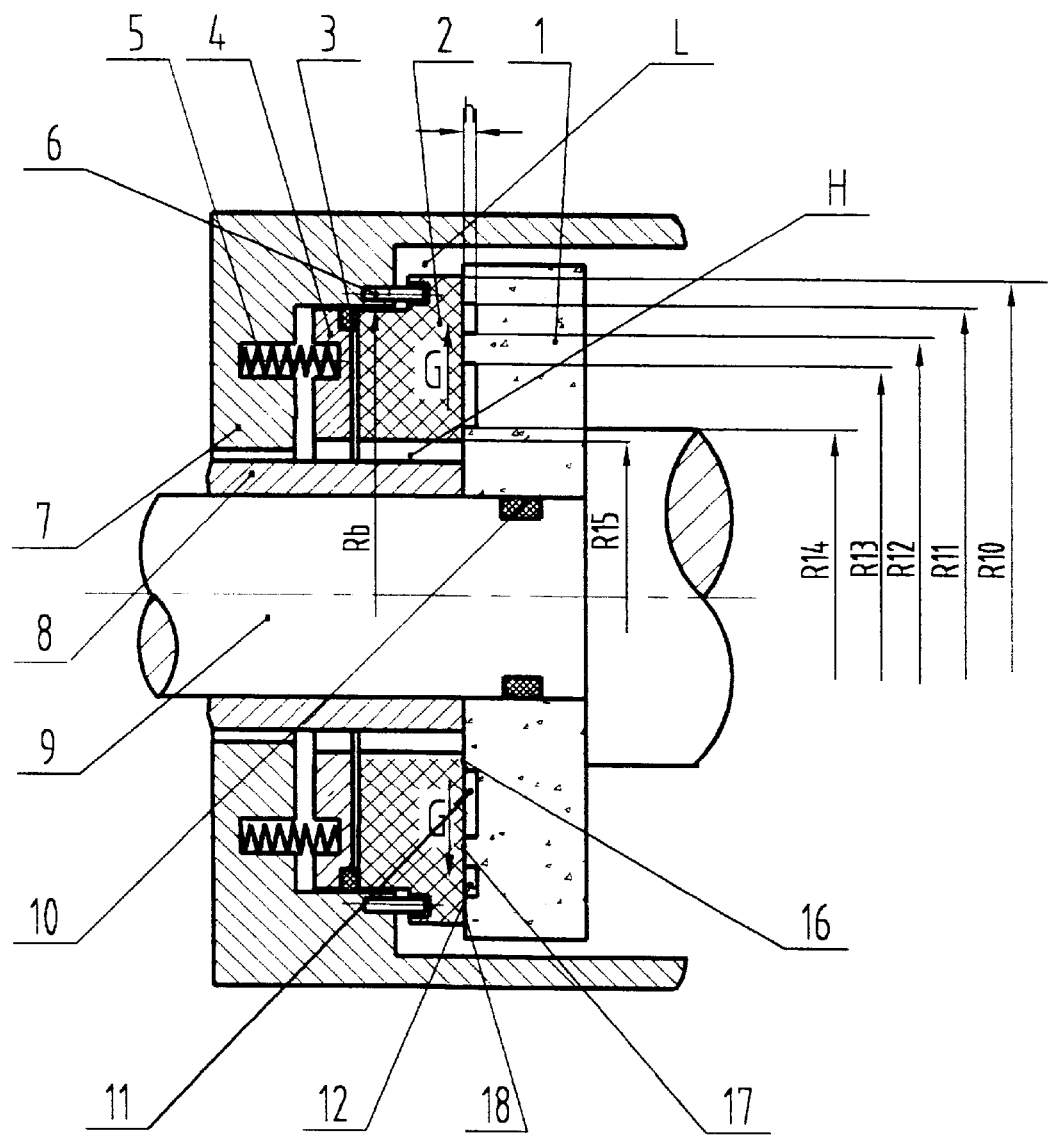
FIG. 9 is a view of a face seal with downstream pumping double spiral grooves, showing the spiral grooves provided on the rotating ring, wherein the inside of the interface is a high pressure side.

FIG. 9 shows a face seal. The inside of the interface is the high pressure side, i.e. the upstream H, and the outside of the interface is the low pressure side, i.e. the downstream L. The spiral grooves are only formed on the sealing face of the rotating ring 1.

Figure 10:
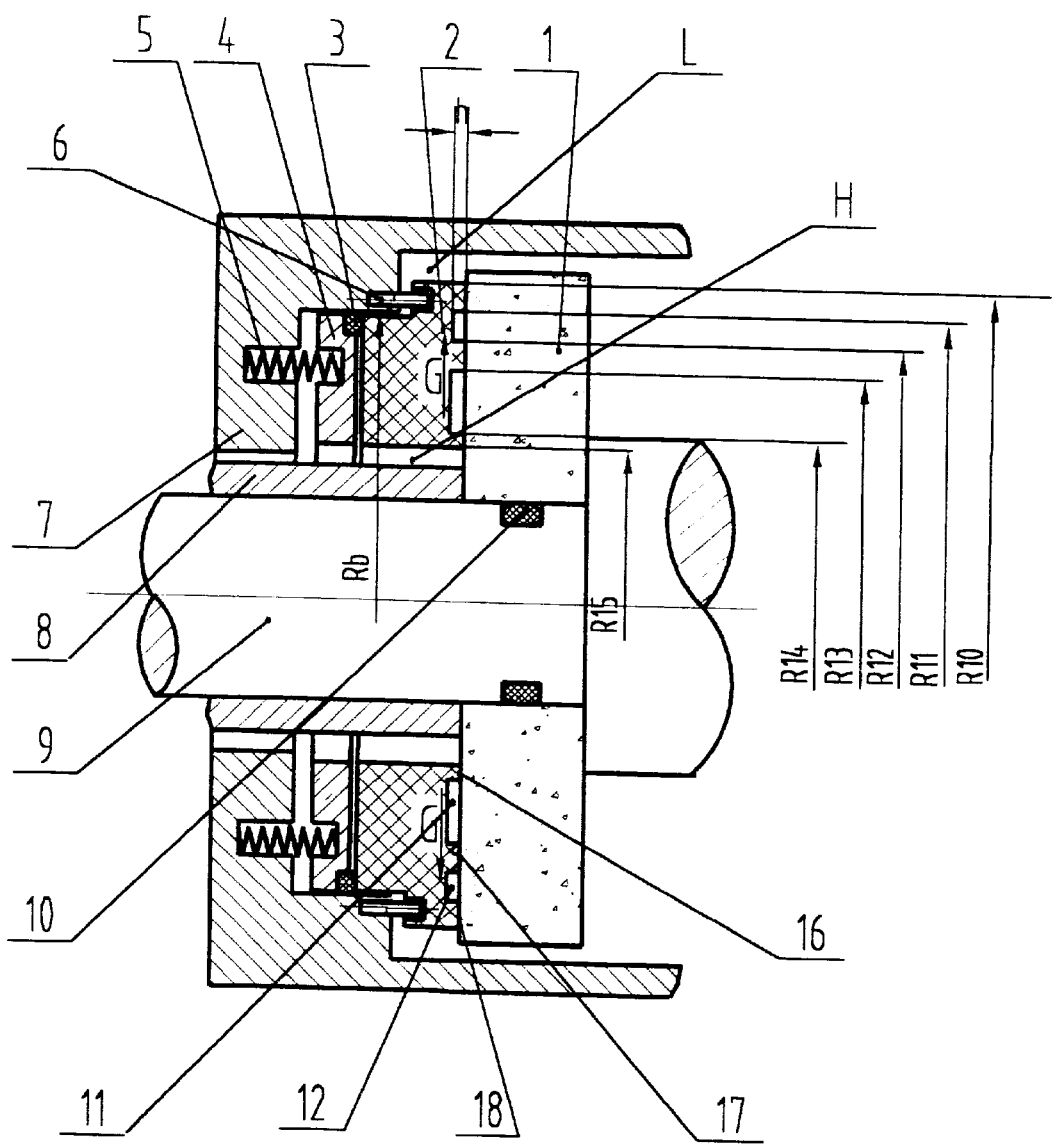
FIG. 10 is a view of a face seal with downstream pumping double spiral grooves, showing the spiral grooves provided on the stationary ring, wherein the inside of the interface is a high pressure side.

FIG. 10 shows a face seal. The inside of the interface is the high pressure side, i.e. the upstream H, and the outside of the interface is the low pressure side, i.e. the downstream L. The spiral grooves are only formed on the sealing face of the stationary ring 2.

Figure 11:
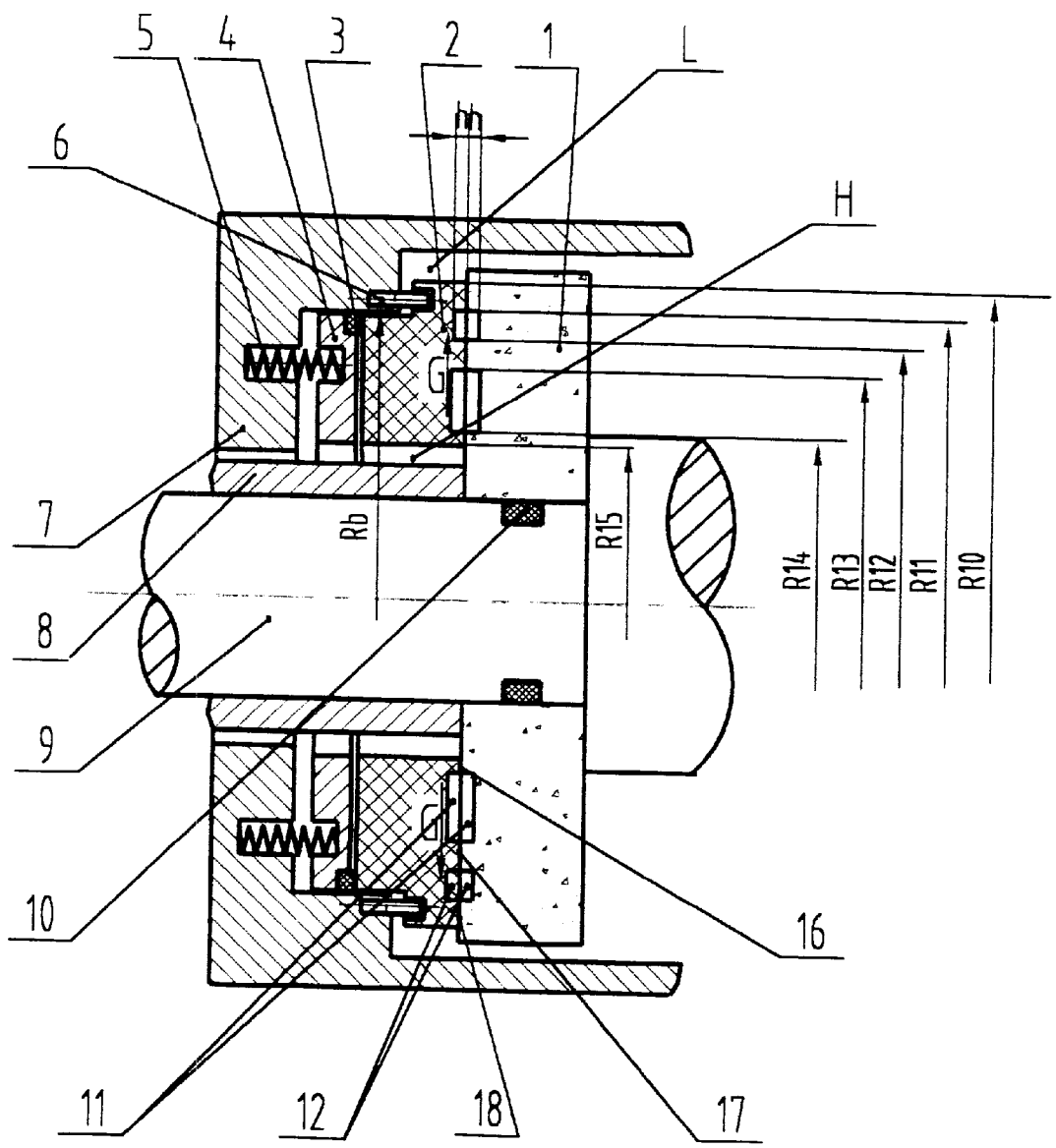
FIG. 11 is a view of a face seal with downstream pumping double spiral grooves, showing the spiral grooves provided at the same time on the rotating and the stationary rings, wherein the inside of the interface is a high pressure side.

FIG. 11 shows a face seal. The inside of the interface is the high pressure side, i.e. the upstream H, and the outside of the interface is the low pressure side, i.e. the downstream L. The spiral grooves are formed both on the rotating ring 1 and the stationary ring 2.

FIGS. 12–15 show the possible patterns and positions of the spiral grooves on the sealing face.

Figure 12:
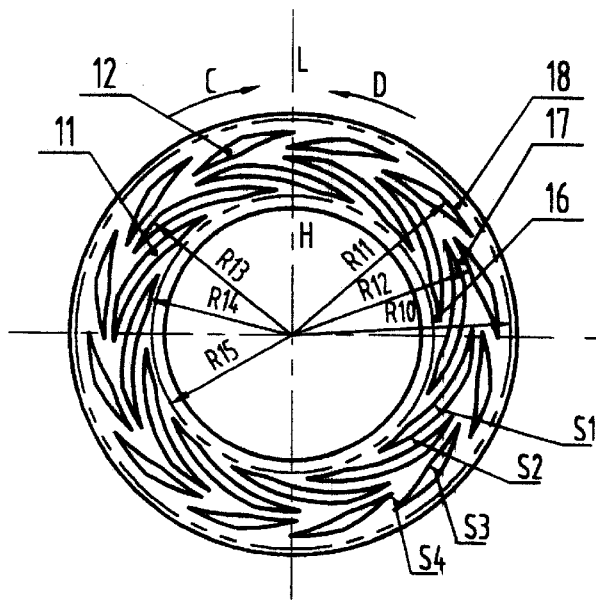
FIG. 12 is a plan view of a sealing face, wherein the inside of the interface is a high pressure side and an annular flat belt is located both between two spiral groove sets and inside the upstream spiral grooves.

FIG. 12 is a view showing a sealing face, wherein an annular flat belt is located both between two spiral groove sets and on the inside of the upstream spiral grooves 11. An annular flat belt 17 is located between two spiral groove sets, i.e. between $R_{12}$ and $R_{13}$. These two spiral grooves are not jointed with each other and configured as a pattern of "∧". On the inside of the upstream spiral grooves 11 is an annular flat belt 16, i.e. between $R_{14}$ and $R_{15}$. At the downstream of the downstream spiral grooves 12 is further an annular flat belt 18, i.e. between $R_{10}$ and $R_{11}$. In FIG. 12, the radial length of the upstream spiral groove is ($R_{13}$–$R_{14}$) and the radial length of the downstream spiral groove is ($R_{11}$–$R_{12}$). The two-dot and dash lines shown in FIG. 12 and the following figures indicates the inner and outer edge circles of the interface between the rotating and the stationary rings.

Figure 13:
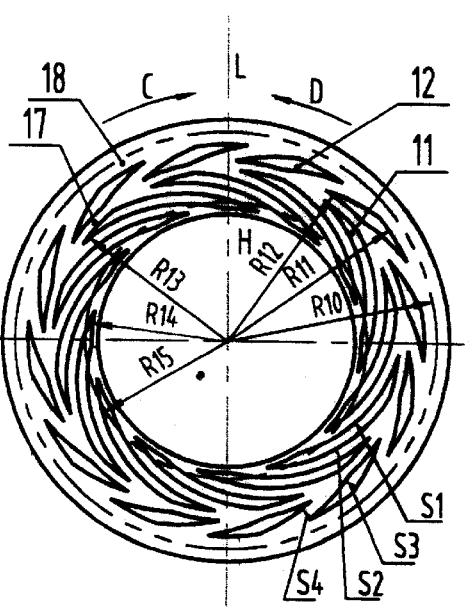
FIG. 13 is a plan view of a sealing face, wherein the inside of the interface is a high pressure side and an annular flat belt is located between two spiral groove sets. However there is no annular flat belt inside the upstream spiral grooves.

FIG. 13 is a view of a sealing face showing that an annular flat belt 17 is located between two spiral groove sets while no annular flat belt is on the inside of the upstream spiral grooves 11. As shown in FIG. 13, the radial length of the upstream spiral grooves is ($R_{13}$–$R_{15}$), and at the downstream of the downstream spiral grooves 12 is an annular flat belt 18, i.e. between $R_{10}$ and $R_{11}$.

Figure 14:
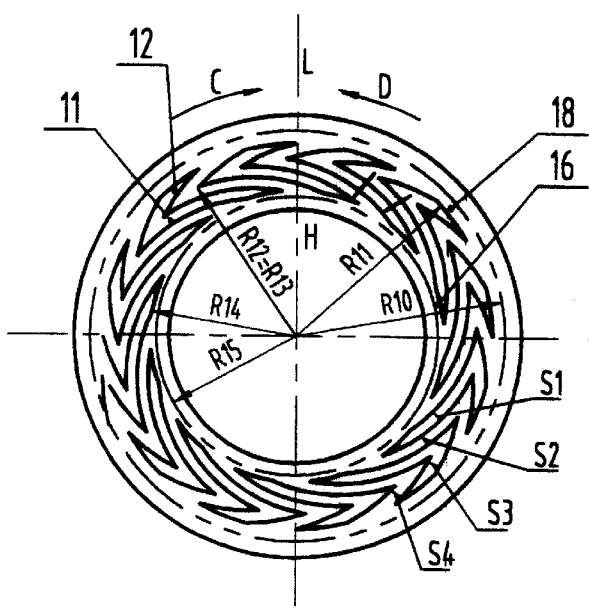
FIG. 14 is a plan view of a sealing face, wherein the inside of the interface is a high pressure side. There is no annular flat belt located between two spiral groove sets. However there is an annular flat belt inside the upstream spiral grooves.

FIG. 14 is a view of a sealing face showing that no annular flat belt is located between two spiral groove set while on the inside of the upstream spiral grooves 11 is an annular flat belt 16. Two spiral groove sets are jointed with each other, $R_{12}$=$R_{13}$, and configured as a pattern of "∧". At the downstream of the downstream spiral grooves 12 is an annular flat belt 18, i.e. between $R_{10}$ and $R_{11}$.

Figure 15:
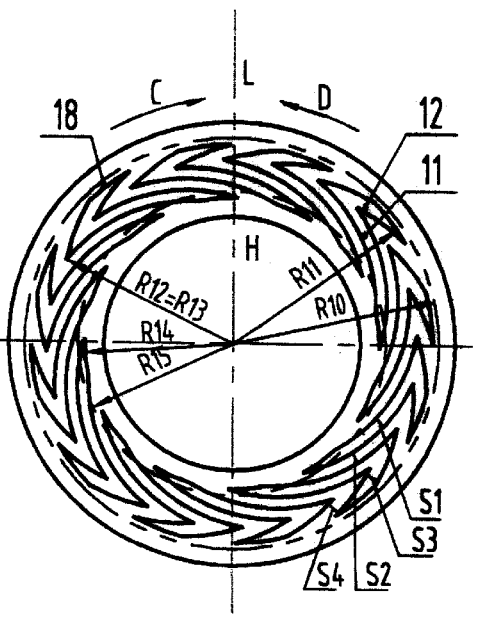
FIG. 15 is a plan view of a sealing face, wherein the inside of the interface is a high pressure side. There is no annular flat belt located between two spiral groove sets and inside the upstream spiral grooves.
Figure 16:
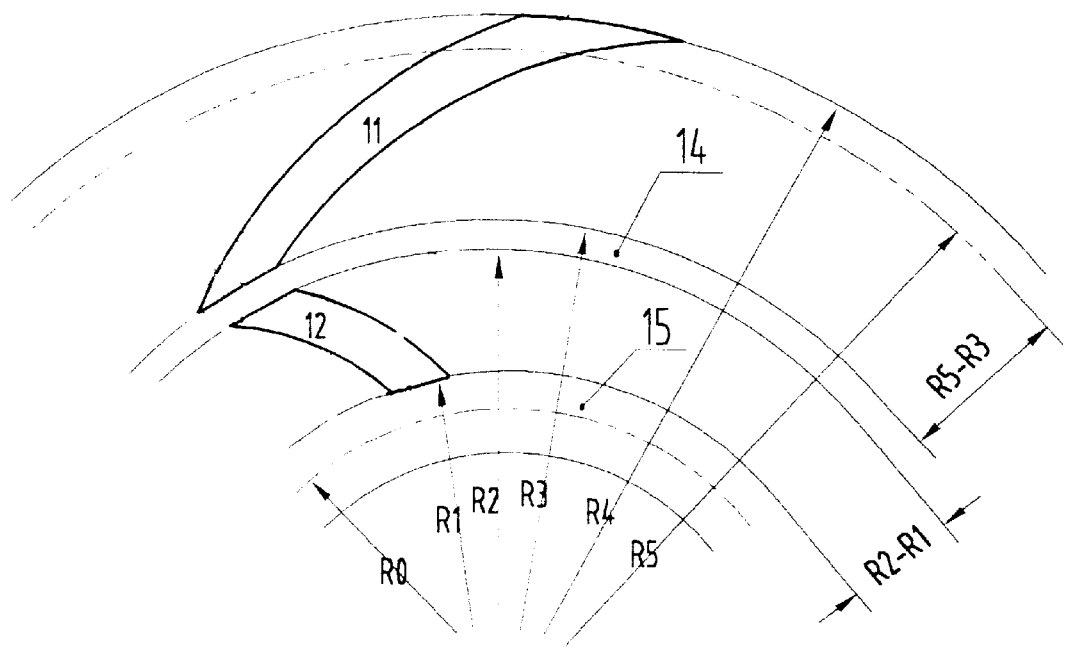
FIG. 16 is a partially enlarged view of FIG. 6.

FIG. 15 is a view of a sealing face showing that there is no annular flat belt between two spiral groove sets and inside the upstream spiral grooves 11. As shown in FIG. 15, the radial length of the upstream spiral grooves 11 is ($R_{13}$–$R_{15}$). Two spiral groove sets are jointed with each other, $R_{12}$=$R_{13}$. At the downstream of the downstream spiral grooves 12 is an annular flat belt 18, i.e. between $R_{10}$ and $R_{11}$.

The profile, the spiral angle, the depth and the width of the spiral groove, and the ratio between the land and the width of the spiral groove in FIG. 9–15 is the same as those in FIGS. 1–8.

It shall be noted that under the condition when a downstream groove and an upstream groove are intersected, there is not necessary that $R_2$ be equal to $R_3$ and that $R_{12}$ be equal to $R_{13}$.

The essential characteristic which distinguishes the present invention from the hydrodynamic face seal with double spiral grooves is: the radial length of a spiral groove at the high pressure side, i.e. at the upstream, is greater than that on the low pressure side, i.e. at the downstream. Therefore, the overall effect of these two spiral groove sets is to pump the sealing fluid downstream, i.e. from the upstream towards the downstream, so that at the cost of the slight leakage, the greater thickness and stiffness of the fluid film are gotten in return.

The face seal according to the present invention can be arranged in various manner, such as single seal, face-to-face double seal, back-to-back double seal, tandem seal arrangement, triple tandem seal arrangement, the combination of a double seal and a single seal, etc.

The face seal according to the present invention is a combined hydrodynamic and hydrostatic non-contacting face seal. Its advantages are the greater thickness and stiffness of the fluid film between the faces of the rings. The face seal is suitable for the sealing fluid both with high viscosity (such as oil) and low viscosity (such as water or gas). It is also suitable for both the low and the high pressure condition and in both high and low speed rotation. The present invention can be used for the seal of various rotary machines, such as compressor, expander, separator, pump, agitator of reactor, etc. in particular for dry gas seal.

While the description of the invention has been given with respect to preferred embodiments, it is not to be constructed in a limiting sense. Variations and modifications will occur to those skilled in the art. Reference is made to the appended claims for a definition of the invention.

What is claimed is:

1. A face seal with spiral grooves which is used on a rotating shaft of a machine, comprising:

a rotating ring including a sealing face;

a stationary ring including a sealing face; the sealing face of the stationary ring is confronted with the face of the rotating ring to form an annular sealing interface; the interface has a high pressure side, being an upstream side, and a low pressure side, being a downstream side;

sealing fluid with low viscosity is in the interface;

the face of the rotating ring can rotate relatively to the face of the stationary ring;

two sets of spiral grooves are provided at least on one of the faces of the rotating and the stationary ring, wherein one set of grooves is disposed on the high-pressure side, which is on the upstream side which pumps sealing fluid downstream; and the other set of grooves is disposed on the low pressure fluid side which is at the downstream side, which pumps sealing fluid upstream;

the ratio of the radial length of a groove on the upstream side to the radial length of a groove on the downstream side is greater than 1 and less than or equal to 5, excluding 1.50–2.33;

a first non-grooved annular flat belt is formed between two sets of spiral grooves;

a second non-grooved annular flat belt portion is formed at the downstream of the set of spiral grooves on the downstream side.

2. A face seal with spiral grooves as claimed in claim 1, wherein the profile of two groove walls of a groove is a substantially logarithm spiral.

3. The face seal with spiral grooves as claimed in claim 2, wherein the profile of the groove wall has a spiral angle and the range of the spiral angle of the profile of the groove wall of a spiral groove is 5°–30°.

4. The face seal with spiral grooves as claimed in claim 3, wherein the profile of the groove wall of a spiral groove is a logarithm spiral or a section of a circle having a center offsetting from that of the interface.

5. The face seal with spiral grooves as claimed in claim 3, wherein the profile of the groove wall of a spiral groove is a straight line.

6. The face seal with spiral grooves as claimed in claim 1, wherein the depth of the spiral groove is constant and the range of the depth is 0.002–0.2 mm.

7. The face seal with spiral grooves as claimed in claim 6, wherein the range of the depth of the spiral groove is 0.005–0.1 mm.

8. The face seal with spiral grooves as claimed in claim 1, wherein the depth of the spiral groove is varied and the range of the depth is 0.002–0.2 mm.

9. The face seal with spiral grooves as claimed in claim 8, wherein the range of the depth of the spiral groove is 0.005–0.1 mm.

10. The face seal with spiral grooves as claimed in claim 1, wherein the range of the normal width of a spiral groove is 0.2–20 mm.

11. The face seal with spiral grooves as claimed in claim 10, wherein the range of the normal width of a spiral groove is 0.5–10 mm.

12. The face seal with spiral grooves as claimed in claim 1, wherein the ration of the normal width of a land between two adjacent upstream or downstream spiral grooves to the normal width of the spiral groove is 0.2–5.

13. The face seal with spiral grooves as claimed in claim 12, wherein the ratio of the normal width of the land between two adjacent upstream or downstream spiral grooves to the normal width of the spiral groove is 0.3–3.

* * * * *